United States Patent [19]

Liming et al.

[11] Patent Number: 4,989,536

[45] Date of Patent: Feb. 5, 1991

[54] ANTENNA CLAMP

[76] Inventors: Richard E. Liming; Treesa V. B. Liming, both of 916 Woodlawn Ave., Springfield, Ohio 45504

[21] Appl. No.: 532,126

[22] Filed: Jun. 1, 1990

Related U.S. Application Data

[63] Continuation-in-part of Ser. No. 439,184, Nov. 20, 1989, abandoned.

[51] Int. Cl.$^5$ ............................................. G09F 17/00
[52] U.S. Cl. ................................. 116/173; 116/28 R; 116/209; 248/219.2; 248/229; 248/231.6
[58] Field of Search ............ 24/129 A, 129 D, 129 R, 24/136 L; 40/591, 592; 116/28 R, 173–175, 209, 264, 265; 248/219.2, 229, 231.6

[56] References Cited

U.S. PATENT DOCUMENTS

| | | | |
|---|---|---|---|
| 2,856,891 | 10/1958 | Solomon | 116/173 |
| 3,172,220 | 3/1965 | Christensen | 40/591 |
| 3,526,050 | 9/1970 | Weller | 40/591 |
| 4,526,820 | 7/1985 | Haas | 428/31 |
| 4,624,211 | 11/1986 | Jokel | 116/209 |

Primary Examiner—William A. Cuchlinski, Jr.
Assistant Examiner—W. Morris Worth

[57] ABSTRACT

An antenna clamp comprises complementary halves configured to fit onto the mast and tip of a vehicle antenna to hold the cord of a banner-like object. A cap-like structure is pressed over the assemblage to hold it in place and is itself held frictionally and/or by securing elements. The antenna clamp is designed to swivel with the wind and have no effect on antenna or reception. It will not come off at random but can be removed only when intended.

4 Claims, 2 Drawing Sheets

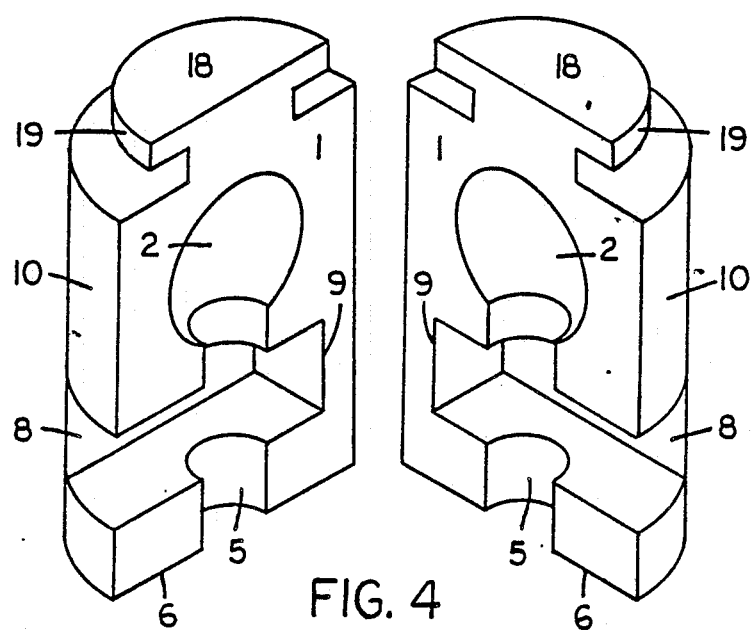
FIG. 4
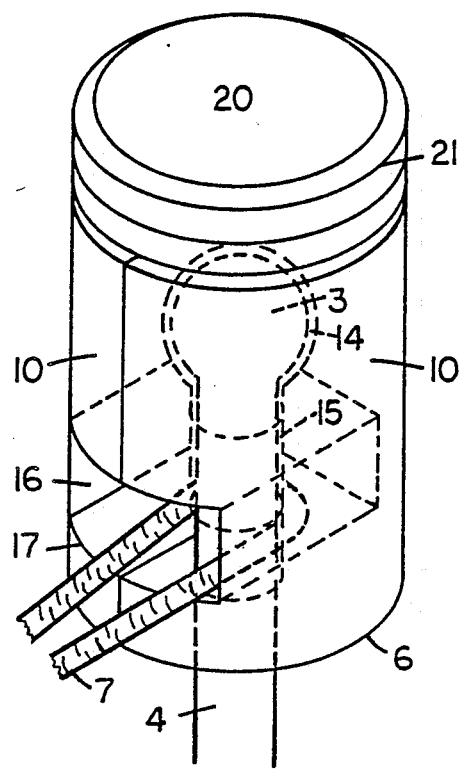
FIG. 5
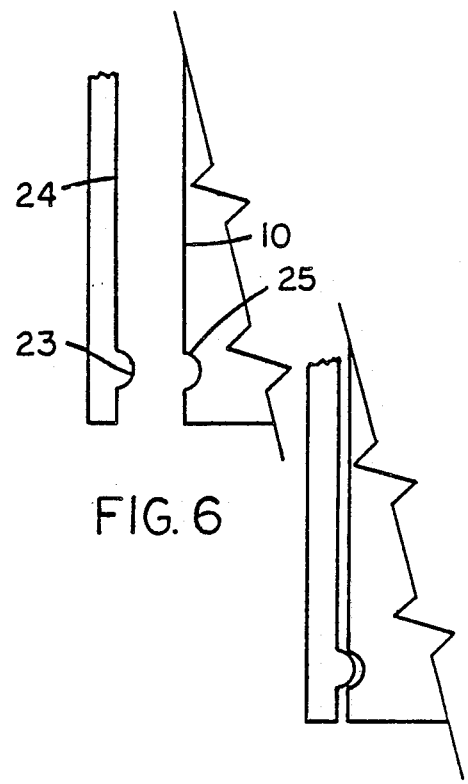
FIG. 6
FIG. 7

ANTENNA CLAMP

This is a Continuation-In-Part application of Ser. No. 07/439,184, filed Nov. 20, 1989, now abandoned.

BACKGROUND OF INVENTION

1. Field of the Invention

The present invention relates to a device that when affixed to the top of a vehicle antenna mast allows a cord of a banner-like object to be both securely held in place and easily removed when desired.

2. Prior Art

We have wanted to attach a small banner at the top of our vehicle antenna mast in order to identify it more easily, especially in a parking area, and to beautify the "vehicle in motion" as air flows over a banner's surface. Motorists resort to various makeshift, temporary and unsatisfactory methods to accomplish this. Even a tennis ball-like device severely limits variation for identification and offers no air-flow affect. No device is known which conveniently and securely holds a cord of a small banner-like object at the top of a vehicle antenna mast.

SUMMARY OF INVENTION

A principle object of the present invention is to provide a device for holding securely a cord of a banner-like object to the top of an antenna mast for attractive identification of a vehicle when parked or when in motion, a device which remains securely on the antenna and is removable only when intended.

And is an object of the present invention to be appropriately sized, light in weight, inexpensively constructed and suitable for weather extremes.

It is also an object of the present invention that when in place there will be no adverse effect on reception or on the physical properties of an antenna.

Furthermore, it is an object of the present invention to provide a device which is free to rotate in accordance with a directional change in air flow.

The foregoing objects are accomplished by providing an antenna clamp comprising an inner part and an outer part. The inner part consists of two complementary halves configured when closed together as a means for fitting around a vehicle antenna mast and tip in order to hold a cord of a banner-like object around a mast and passing through an opening in the outer side surface of the inner part. The closed halves of the inner part are held in place at the top of the antenna by pressing on an outer part configured as a means for fitting tightly and for remaining securely in place over the inner part in order to hold the inner part around the antenna mast and tip.

Removing the outer part allows the complementary halves to separate and free the cord from the stem of the antenna.

While a cord from a banner-like object is held securely around a mast, the antenna clamp and cord are free to swivel. In this arrangement a cord can neither slide down a mast nor fly off the top. The outer part can be removed from the inner part when intended, and only when intended, and the inner part opened so that a banner-like object can be removed from an antenna mast for whatever purpose.

BRIEF DESCRIPTION OF DRAWINGS

FIG. 4 shows an embodiment of the inner part with the top portion configured to hold a seal part when pressed together.

FIG. 5 shows the inner part of FIG. 4 wherein the halves of the inner part are closed, the cord coming out an opening in the side surface and the seal part in place.

FIG. 6 shows an embodiment of interlocking elements on segment, surfaces of the inner and outer parts.

FIG. 7 shows the interlocking elements of FIG. 6 fully engaged.

DETAILED DESCRIPTION OF THE PREFERRED EMBODIMENT

The present invention, an antenna clamp, comprises an inner part consisting of two complementary halves configured as a means for fitting around a vehicle antenna mast and tip to hold a cord of a banner-like object around a mast and passing through an opening in the outer side surface, and an outer part configured as a means for fitting securely over the complementary halves of the inner part when closed over an antenna mast and tip and to hold fast the inner part onto the antenna mast and tip until removal of the outer part from the inner part is desired.

Figure 1:
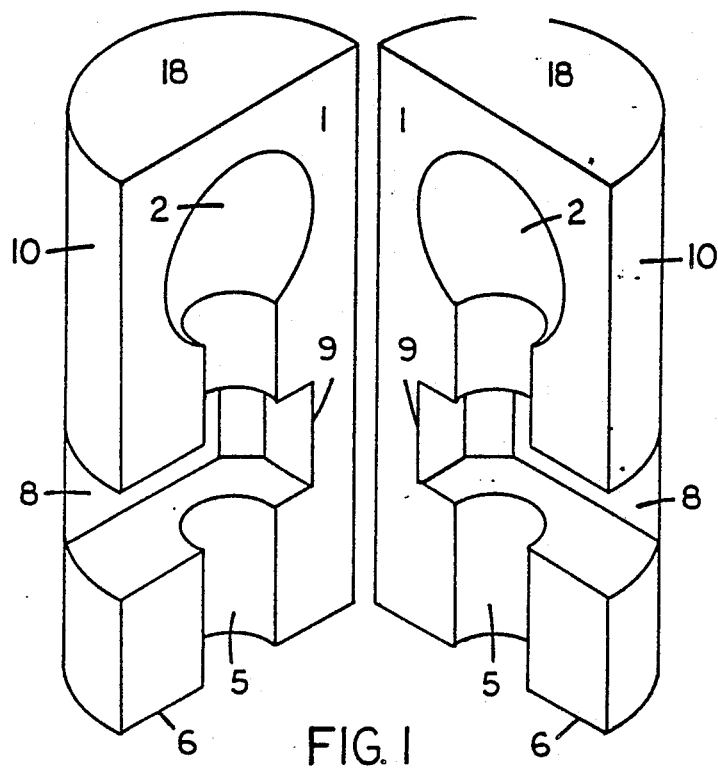
FIG. 1 shows the preferred embodiment of the complementary halves of the inner part of the antenna clamp.

Refer now to FIG. 1 which is an overall drawing of a preferred embodiment of the invention. It shows the inner part as an elongated cylinder-like object consisting of complementary halves which can be molded from a plastic-like substance.

Each of the abutment surfaces 1 of the complementary halves comprises the following configurations: a ½ ball-like cavity 2 near its center, a ½ cone-like cavity 5 extending longitudinally from the ball-like cavity 2 to a bottom side 6, and a ½ channel-like cavity 8 traversing the cone-like cavity 5 having one closed end 9 and extending to the outer side surface 10 of the inner part.

Figure 2:
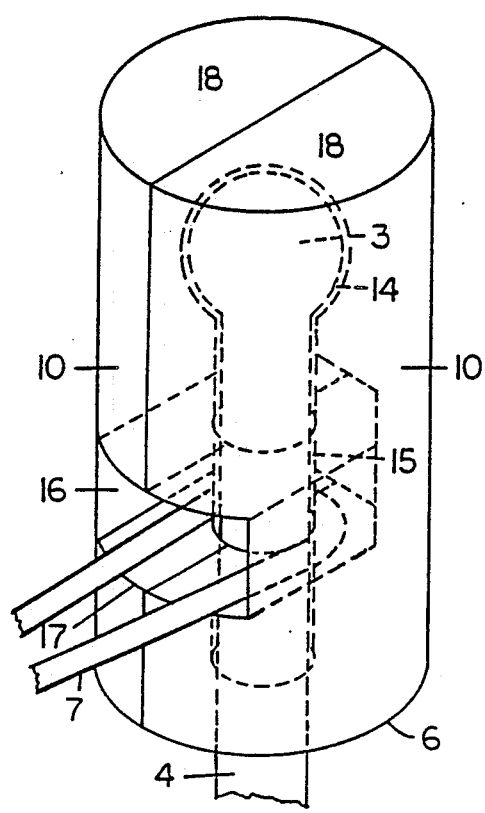
FIG. 2 shows the preferred embodiment of the inner part with abutment surfaces of the complementary halves closed onto an antenna mast and tip with cord of a banner-like object held around mast and passing through an opening in the outer side surface.

When the abutment surfaces of the halves of the inner part are pressed together as in FIG. 2 complementary ½ cavities are joined and become completely formed interconnected whole cavities: that is, a completely formed ball-like cavity 14, a completely formed cone-like cavity 15, and a completely formed channel-like cavity 16.

The inner part shown open in FIG. 1 and closed in FIG. 2 performs as follows: cord 7 of a banner-like object is brought over a vehicle antenna tip 3 and pulled taut against the mast 4. The two complementary halves are pressed together over an antenna tip 3 and mast 4 with cord 7 in channel 16 taut around mast 4 and passing through opening 17.

Figure 3:
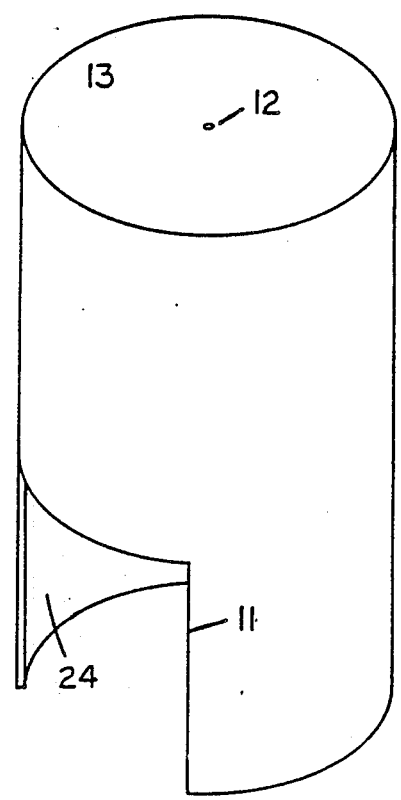
FIG. 3 shows the preferred embodiment of the outer part of the antenna clamp.

To hold the inner part closed around tip and mast, with cord in place, an outer part FIG. 3 comprising a one piece cap-like structure which can be molded from a plastic-like substance is constructed to fit tightly over the full length of the closed halves of the inner part in order to keep the inner part around the antenna mast and tip, and in the preferred embodiment be held in place over the inner part by securing means of partial vacuum, friction and gravity.

The outer part as shown in FIG. 3 is constructed with an orifice 12 centered in top surface 13 and an opening 11 arranged and sized to correspond with opening 17 in an outer side surface 10 of the closed inner part.

Orifice 12 in top of the outer part facilitates the pressing on of a tightly fitting outer part over an inner part by relieving pressure build-up. And such a placed orifice also facilitates retention of the outer part—a particularly significant and desirable aspect in this preferred embodiment—by relieving a partial vacuum that develops when and only when there is a sustained pull to remove the cap-like structure. If there is no sustained pull—and such would be the situation in a random movement between parts caused by any vehicle or wind motion—a partial vacuum impedes removal.

Likewise, friction that develops as tightly fitting parts move by each other functions to keep the parts together unless there is intended and continued pull to separate the parts as is the situation in a intended removal.

Finally the force of gravity tends to hold the outer part over the inner part by the weight of the former, small as it is. In this preferred embodiment wind can have no lifting effect to counter gravity or other securing means because there is no significant surface aligned or available to provide lift as in the case of a wing-type object.

Therefore, in the preferred embodiment the securing means is selected from the group consisting of partial vacuum, friction and gravity to keep the outer part in place over the inner part. The outer part is held in place until removal is intended, and only when intended, and achieved by a sustained pull of the outer part from the securing means working in conjunction with the orifice.

The act of pressing on and removing the outer part is aided in both the preferred embodiment and the embodiment using the seal part by the presence in the top of the outer part of an orifice. The orifice allows air to enter with a sustained pull and thus break a partial vacuum. Without a sustained pull as would be the case in random movement, the orifice does not come into play and the parts remain held together.

An alternative embodiment shown in FIG. 6 is one of many possible examples of interlocking elements which can be molded on the outer and inner parts and act as securing means to keep the outer part securely in place over the inner part by an engagement of interlocking elements until the outer part is removed from the inner part only by means of an intended disengaging of interlocking elements.

The example in FIG. 6 separately depicts female engaging elements 25 molded at diverse locations around the bottom parameter on the outer side surface of the inner part 10 and male engaging elements 23 molded opposite the female elements on the inner side surface of the outer part 24. These engaging elements interlock as shown in FIG. 7 when inner and outer parts are fully pressed together. The inner and outer parts are securely held in place by this method of interlocking elements until disengagement takes place. Random movement will not cause disengagement; only intended action will disengage the elements.

Another embodiment shown in FIGS. 4 and 5 includes a seal part 20 configured to fit around a flange 19 and over a top portion 18 of the complementary halves of the inner part when closed around an antenna mast and tip. The outer part of FIG. 3 is pressed over the inner part with the seal part 20 in place making a tight fit because the edges 21 of the seal part fit against the inside wall of the outer part.

Thus the seal part acts as the securing means of this embodiment by creating a partial vacuum between the inner and outer parts whenever removal is attempted. The partial vacuum can only be relieved and the outer part be removed from the inner part when there is a sustained and intended pulling off of the outer part by drawing air through the orifice to relieve the partial vacuum.

The orifice also acts to relieve a pressure build-up when the outer part is pressed over the inner part with seal part in place. Thus, working in tandem the seal part and orifice function importantly in the embodiment by resisting to the point of prevention any random removal which might result from vehicle motion or wind pressure.

In all embodiments noted the inner part holds the cord around the mast; the outer part holds the inner part to the mast and tip and is itself held in place over the inner part by differing securing means. In all cases the clamp is free to rotate because ball and stem cavities of the inner part are designed to be slightly larger than the structures they enclose.

In this preferred embodiment an elongated cylinder-like structure is shown and discussed in FIGS. 1, 2 and 3 as well as in other embodiments shown in FIGS. 4 and 5. Other shaped structures for inner and outer parts would be as feasible. Furthermore, other embodiments can provide means to attach the complementary halves to each other to make it easier to mount or dismount a cord of a banner-like object.

In summary, an inner part and an outer part form the antenna clamp of the preferred embodiment of this invention. The inner part is so made that it holds a cord from a banner-like object around a mast and is itself held around a mast and tip after being capped with a tightly fitting outer part pressed fully down over it. A functioning orifice to relieve a partial vacuum, friction of tightly fitting parts and weight of the outer part itself—these provide the necessary securing means for keeping the outer part in place over the inner part until there is an intended removal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An antenna clamp for holding a cord of a banner-like object to a vehicle antenna mast, comprising:
    an inner part consisting of complementary halves configured when closed together to form a means rotatably fitting around a vehicle antenna mast and tip to hold said cord around said mast within said inner part, said cord passing through an opening in an outer side surface of said inner part, and
    an outer part comprising a one piece cap-like structure fitting tightly over said inner part in order to keep said inner part around said antenna mast and tip and having an orifice in a top surface thereof and an opening arranged and sized to correspond with said opening in said outer side surface of said inner part, said inner and outer parts being frictionally fitted together so as to keep said outer part securely in place over said inner part until there occurs a sustained pulling of said outer part from said inner part which acts in conjunction with the drawing of air in through said orifice to relieve a partial vacuum formed between said inner and outer parts during removal of said outer part.

2. An antenna clamp as in claim 1 wherein an abutment surface of each complementary half includes:

a ½ ball-like cavity near its center, and a ½ cone-like cavity extending longitudinally from said ball-like cavity to a bottom side, and a ½ channel-like cavity traversing said cone-like cavity having one closed end and extending to the outer side surface of said inner part, so that when said abutment surfaces of said halves of said inner part are pressed together said complementary ½ cavities are joined and become interconnected completely formed whole cavities for receiving said mast, tip and cord therein.

3. An antenna clamp as in claim 1 for further including molded interlocking elements on said outer and inner parts wherein said interlocking elements act as securing means to keep said outer part securely in place over said inner part by an engagement of said interlocking elements until said outer part is removed from said inner part only by an intended disengaging of said interlocking elements.

4. An antenna clamp as in claim 1 further including a sealing means to fit over a top portion of said closed halves of said inner part wherein said sealing means when in place over said inner part acts as securing means to keep said outer part in place over said inner part by creating a partial vacuum between said inner and outer parts whenever removal is attempted, wherein said partial vacuum can only be relieved and said outer part be removed from said inner part by sustained and intended pulling of said outer part in conjunction with the drawing of air in through said orifice to relieve said partial vacuum.

* * * * *